United States Patent
Brockman et al.

(10) Patent No.: US 7,325,877 B2
(45) Date of Patent: Feb. 5, 2008

(54) FOLDABLE HEADREST ASSEMBLY

(75) Inventors: Mark Anthony Brockman, Belle River (CA); Jerry Scott Barko, Windsor (CA); Evan Murray Kayahara, Windsor (CA)

(73) Assignee: Windsor Machine & Stamping Limited, Windsor (CA)

( * ) Notice: Subject to any disclaimer, the term of this patent is extended or adjusted under 35 U.S.C. 154(b) by 0 days.

(21) Appl. No.: 11/553,576

(22) Filed: Oct. 27, 2006

(65) Prior Publication Data

US 2007/0152487 A1    Jul. 5, 2007

Related U.S. Application Data

(63) Continuation-in-part of application No. 11/106,818, filed on Apr. 15, 2005.

(60) Provisional application No. 60/731,317, filed on Oct. 28, 2005, provisional application No. 60/562,662, filed on Apr. 15, 2004.

(51) Int. Cl.
*A47C 1/10*        (2006.01)

(52) U.S. Cl. .................. 297/408; 297/61; 297/403

(58) Field of Classification Search ................ 297/408, 297/410, 61, 403
See application file for complete search history.

(56) References Cited

U.S. PATENT DOCUMENTS

| | | |
|---|---|---|
| 3,449,012 A | 6/1969 | Caron |
| 4,113,310 A | 9/1978 | Kapanka |
| 4,351,563 A | 9/1982 | Hattori |
| 4,376,552 A | 3/1983 | Pilhall |
| 4,512,609 A | 4/1985 | Parsson |
| 4,674,797 A | 6/1987 | Tateyama |
| 4,678,232 A | 7/1987 | Ishida et al. |
| 4,711,494 A | 12/1987 | Duvenkamp |
| 5,011,226 A | 4/1991 | Ikeda et al. |
| 5,145,233 A | 9/1992 | Nagashima |
| 5,551,750 A | 9/1996 | Yoshimura |
| 5,590,933 A * | 1/1997 | Andersson .................. 297/408 |
| 5,660,441 A | 8/1997 | Nagayasu et al. |
| 5,669,667 A | 9/1997 | Schmidt |
| 5,669,668 A | 9/1997 | Leuchtmann |
| 5,681,079 A | 10/1997 | Robinson |
| 5,700,054 A | 12/1997 | Lang |
| 5,722,732 A | 3/1998 | Haldenwanger |
| 5,738,411 A | 4/1998 | Sutton et al. |
| 5,795,023 A | 8/1998 | Kayumi |

(Continued)

*Primary Examiner*—David Dunn
*Assistant Examiner*—Erika Garrett
(74) *Attorney, Agent, or Firm*—Howard & Howard Attorneys, P.C.

(57) ABSTRACT

The foldable headrest assembly includes a first and second support and a first and second paddle. A first and second plate extending from the supports and supported by the paddles rotate in unison about a first axis ($A_1$) from an upright to a forwardly folded position. A lock lever rotatably supported by the first plate rotates about a second axis ($A_2$) between a locked position and an unlocked position. A first biasing member (FBM) is disposed between the plates and a second biasing member (SBM) is supported by the first plate engaging the lock lever. The FBM rotatably biases the supports about the $A_1$ toward the forwardly folded position and the SBM rotatably biases the lock lever about the $A_2$ toward the locked position in a common rotational direction as the rotation of the supports about the $A_1$. A release mechanism for rotating the lock lever is also disclosed.

20 Claims, 14 Drawing Sheets

U.S. PATENT DOCUMENTS

| | | |
|---|---|---|
| 5,806,933 A | 9/1998 | Tsui et al. |
| 5,826,942 A | 10/1998 | Sutton et al. |
| 5,906,414 A | 5/1999 | Rus |
| 5,971,467 A | 10/1999 | Kayumi et al. |
| 6,045,181 A | 4/2000 | Ikeda et al. |
| 6,050,633 A * | 4/2000 | Droual ........................ 297/61 |
| 6,074,010 A | 6/2000 | Takeda |
| 6,129,421 A | 10/2000 | Gilson et al. |
| 6,192,565 B1 | 2/2001 | Tame |
| 6,203,104 B1 | 3/2001 | Matsuo et al. |
| 6,302,485 B1 | 10/2001 | Nakane et al. |
| 6,416,107 B1 | 7/2002 | Kanaguchi et al. |
| 6,485,096 B1 | 11/2002 | Azar et al. |
| 6,550,856 B1 | 4/2003 | Ganser et al. |
| 6,557,933 B1 | 5/2003 | Schambre et al. |
| 6,612,653 B2 | 9/2003 | Takata |
| 6,648,415 B2 | 11/2003 | Bartels |
| 6,702,385 B2 | 3/2004 | Holdampf et al. |
| 6,779,839 B2 | 8/2004 | Andreasson et al. |
| 6,817,646 B2 | 11/2004 | Kikuchi et al. |
| 6,880,890 B1 * | 4/2005 | DeBrabant .................. 297/408 |
| 6,902,232 B2 * | 6/2005 | Kamrath et al. .............. 297/61 |
| 6,935,696 B2 * | 8/2005 | Gauthier et al. ............ 297/408 |
| 2003/0098596 A1 | 5/2003 | Andreasson et al. |
| 2004/0174038 A1 | 9/2004 | Sumida et al. |
| 2004/0195888 A1 | 10/2004 | Frye |
| 2004/0256894 A1 | 12/2004 | McManus et al. |
| 2005/0001463 A1 | 1/2005 | Yetukuri et al. |
| 2005/0017532 A1 | 1/2005 | Oyama |
| 2005/0035642 A1 | 2/2005 | Hake et al. |
| 2005/0242640 A1 | 11/2005 | Barko et al. |

* cited by examiner

FOLDABLE HEADREST ASSEMBLY

CROSS REFERENCE TO RELATED APPLICATION

This application claims the benefit of U.S. Provisional Patent Application Ser. No. 60/731,317 filed on Oct. 28, 2005, which is hereby incorporated by reference, and is a continuation-in-part of U.S. patent application Ser. No. 11/106,818 filed on Apr. 15, 2005, which claimed priority to U.S. Provisional Patent Application Ser. No. 60/562,662 filed on Apr. 15, 2004.

BACKGROUND OF THE INVENTION

1. Field of the Invention

The subject invention relates to headrests for vehicle seats, and more particularly, to a folding headrest assembly that allows for compact storage of vehicle seats.

2. Description of the Prior Art

By way of background, automobile consumers are increasingly demanding multi-purpose vehicles that can be modified to transport either people or cargo. For example, a pickup truck is useful for transporting cargo, but it is inadequate transportation for a modest sized family. Conversely, a mid-sized sedan provides sufficient seating for a typical family, but this same sedan falls short when the owner needs to transport a large object, such as furniture. Multi-purpose vehicles, such as minivans and sport-utility vehicles, solve these conflicting needs by providing seats for passengers that can be folded into a space saving configuration when the vehicle is used to transport cargo.

Headrests situated on the top of vehicle seats provide comfort for an occupant and offer safety protection from accident and crash related injuries, i.e., whiplash. However, the headrest introduces a problem in multi-purpose vehicles with folding seats. Ideally, a seat occupies a minimal volume once folded to a storage position. However, the headrest is an extension by design, adding to the volume occupied by a folded seat, and thereby subtracts from the available cargo space in a multi-purpose vehicle.

For this reason, folding seats were in the past designed without headrests, which discarded the safety and ergonomic benefits provided by the headrest. Additionally, some folding seat designs required the complete removal of the seat from the vehicle to maximize cargo space. However, the procedure for removing and reattaching the seat is awkward and complicated and removal can be impractical when there is no convenient place to store the seat. Some folding seats have removable headrests as shown in U.S. Pat. No. 6,203,104. However, a detached headrest poses additional problems with storage of the headrest when the seat is in a folded or storage position and additionally the headrest may be lost or damaged during the removal. An improvement in the headrest design includes folding headrests that allows the headrest to fold against the seat for easier folding of the seat to a storage position as shown in U.S. Pat. No. 5,826,942. However, the previous folding headrests included rather complicated locking mechanisms for securing the headrest into a position. Therefore, there is utility for a folding headrest design that results in the simplification of the assembly and a locking mechanism that allows for adaptability of the folding headrest for the various seat configuration and space concern within the vehicle.

SUMMARY OF THE INVENTION AND ADVANTAGES

The present invention provides for a foldable headrest assembly including a first support extending from a first distal end to a first support end. The foldable headrest assembly further includes a second support extending from a second distal end to a second support end. The second support is spaced from the first support for supporting a headrest cover. A first plate extends from the first support end and a second plate extends from the second support end. The foldable headrest assembly further includes a first paddle and a second paddle spaced from the first paddle. The first plate is rotatably supported by the first paddle for rotation about a first axis. The second plate is rotatably supported by the second paddle for rotation about the first axis. The second plate moves in unison with the first plate between an upright position and a forwardly folded position about the first axis. The foldable headrest assembly further includes a lock lever rotatably supported on the first plate. The lock lever rotates about a second axis between a locked position and an unlocked position. The locked position engages the first paddle for preventing folding movement from the upright position toward the forwardly folded position. The unlocked position allows such folding movement toward the forwardly folded position. The foldable headrest assembly further includes a first biasing member disposed between the plates and a second biasing member supported by the first plate engaging the lock lever. The first biasing member rotatably biases the supports about the first axis toward the forwardly folded position. The second biasing member rotatably biases the lock lever about the second axis toward the locked position in a common rotational direction as the rotation of the supports about the first axis.

The present invention further provides for a foldable headrest assembly including the supports, the plates, the paddles, and the lock lever. The foldable headrest assembly further includes a release mechanism. The release mechanism includes a conduit and a cable disposed within the conduit. A first end of the conduit is coupled to the lock lever and a second end of the conduit is supported between the plates and the supports. The release mechanism is for rotating the lock lever to the unlocked position allowing the plates to rotate about the first axis from the upright position to the forwardly folded position.

The foldable headrest assemblies of the present invention include a simple and efficient lock lever for maintaining the upright position of the foldable headrest assembly. The biasing members cooperate with each other to prevent the lock lever from unlocking and causing the plates to rotate from the upright position toward the forwardly folded position. The release mechanism is easy to use for moving the lock lever from the locked position to the unlocked position. Location of the ends of the conduit allow for various placements and uses of the foldable headrest assemblies.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
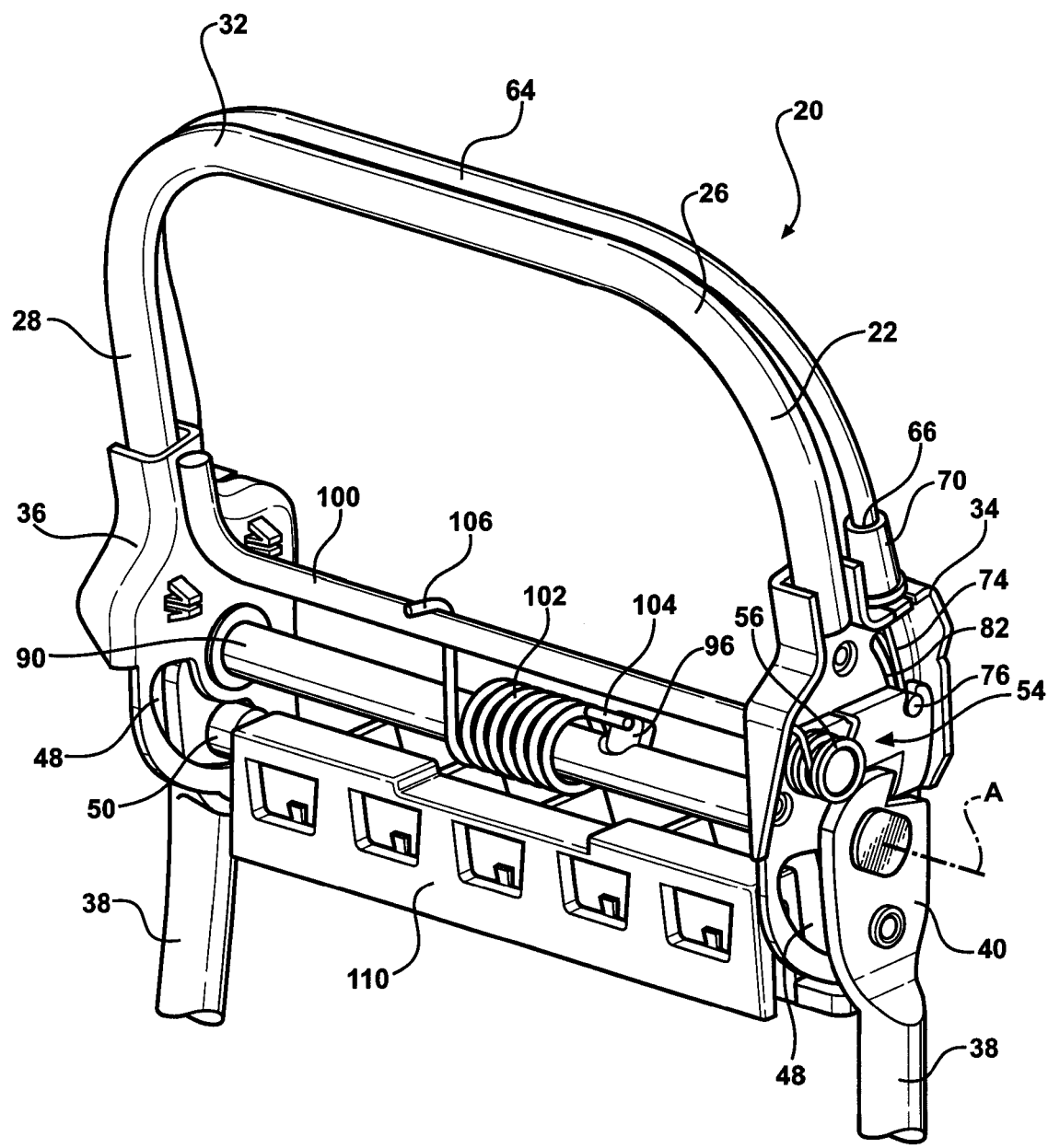
FIG. 1 is a perspective view of a first embodiment.

Referring to the Figures, wherein like numerals indicate corresponding parts throughout the several views, a foldable headrest assembly 20 for a seat is shown generally at 20. The foldable headrest assembly 20 includes a first support 22 extending from a first distal end 24 to a first support end 26 and a second support 28 spaced from the first support 22 and extending from a second distal end 30 to a second support end 32 for supporting a headrest between the support ends 26, 32. The supports 22, 28 can be formed from a singular piece having a generally C-shape with the first support end 26 and the second support end 32 spaced from one another for supporting the headrest.

Figure 2:
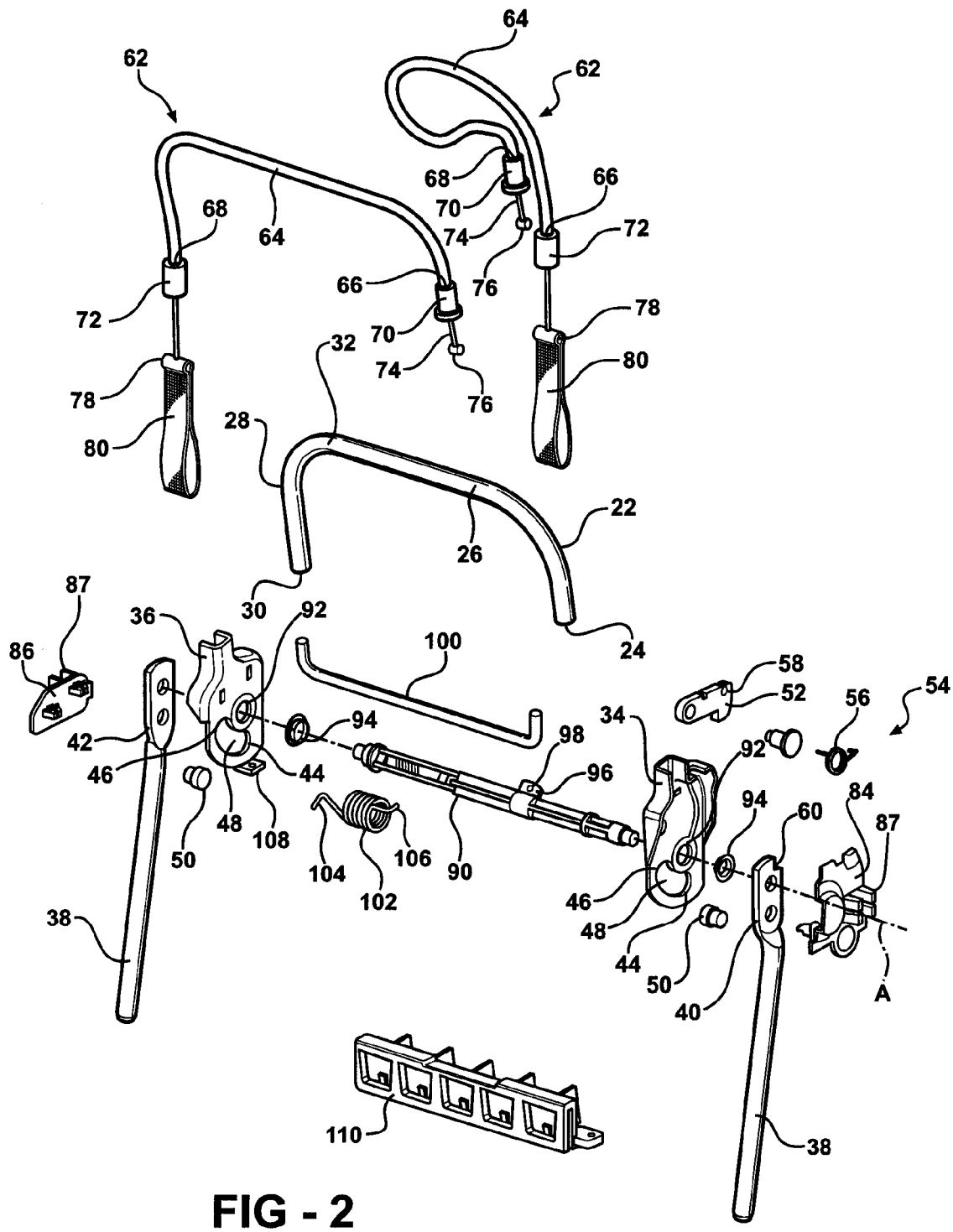
FIG. 2 is an exploded perspective view of the first embodiment.
Figure 3:
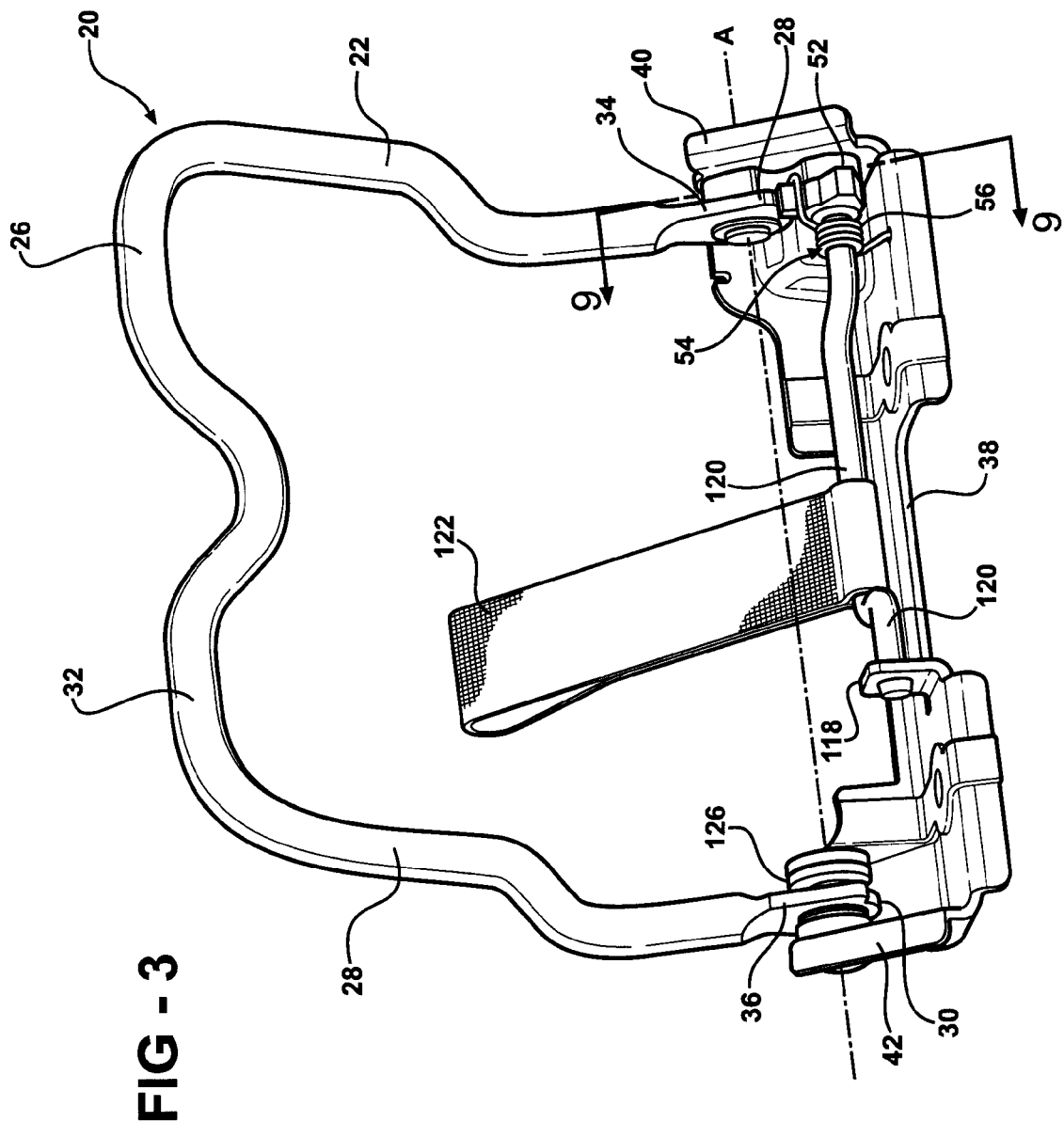
FIG. 3 is a perspective view of a second embodiment.

The headrest assembly 20 further includes a first plate 34 extending from the first distal end 24 and a second plate 36 extending from the second distal end 30. As shown in FIGS. 1 and 2, the first and second plates 34, 36 in the first embodiment are separate components that are connected to the distal ends 24, 30 of the first and second supports 22, 28 by adequate methods known in the art, e.g. welding. In the second embodiment, as shown in FIGS. 2 and 3, the first and second plates 34, 36 are integrally formed at the distal ends 24, 30 of the first and second supports 22, 28.

Figure 4:
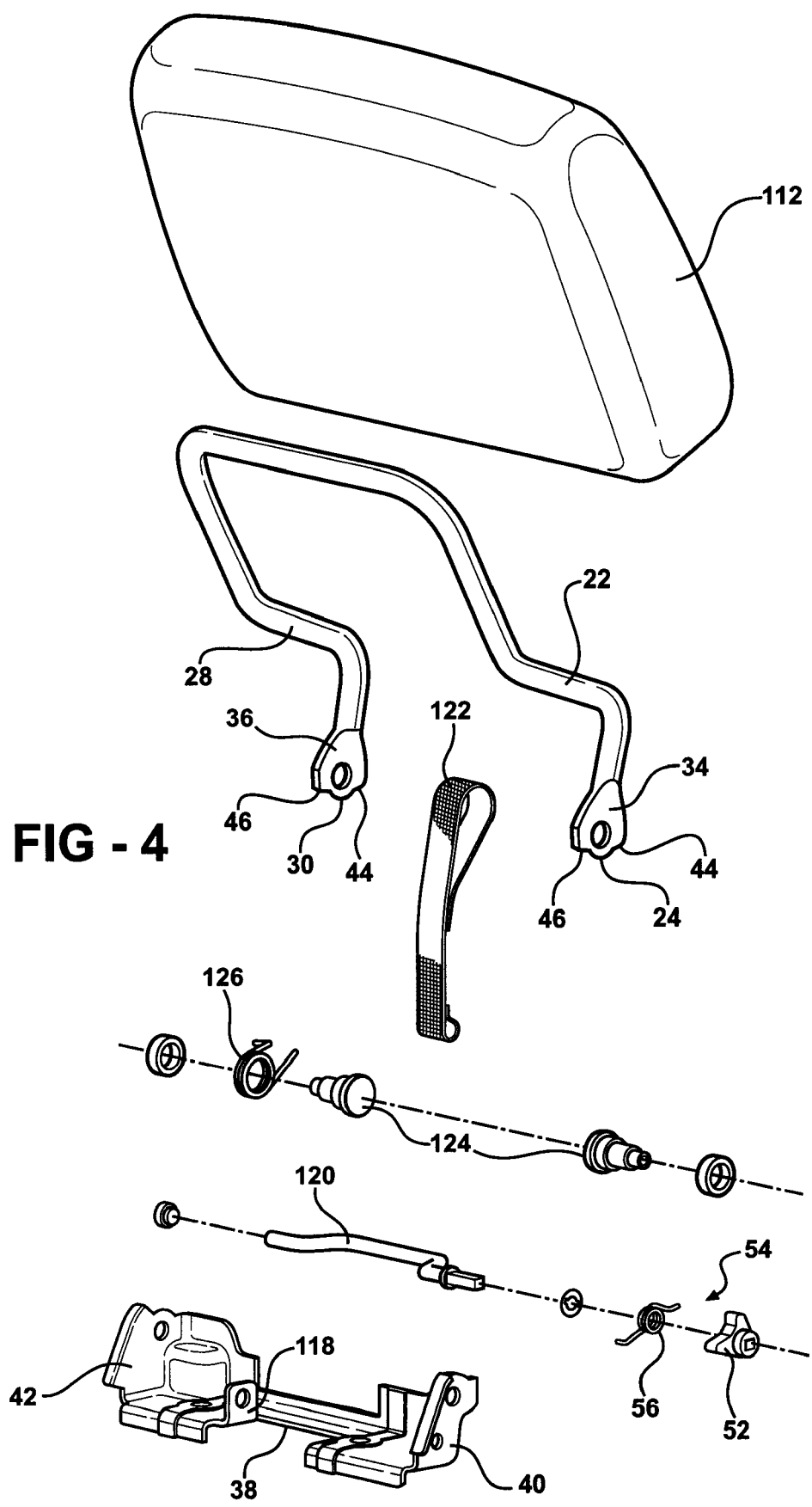
FIG. 4 is an exploded perspective view of the second embodiment.
Figure 5:
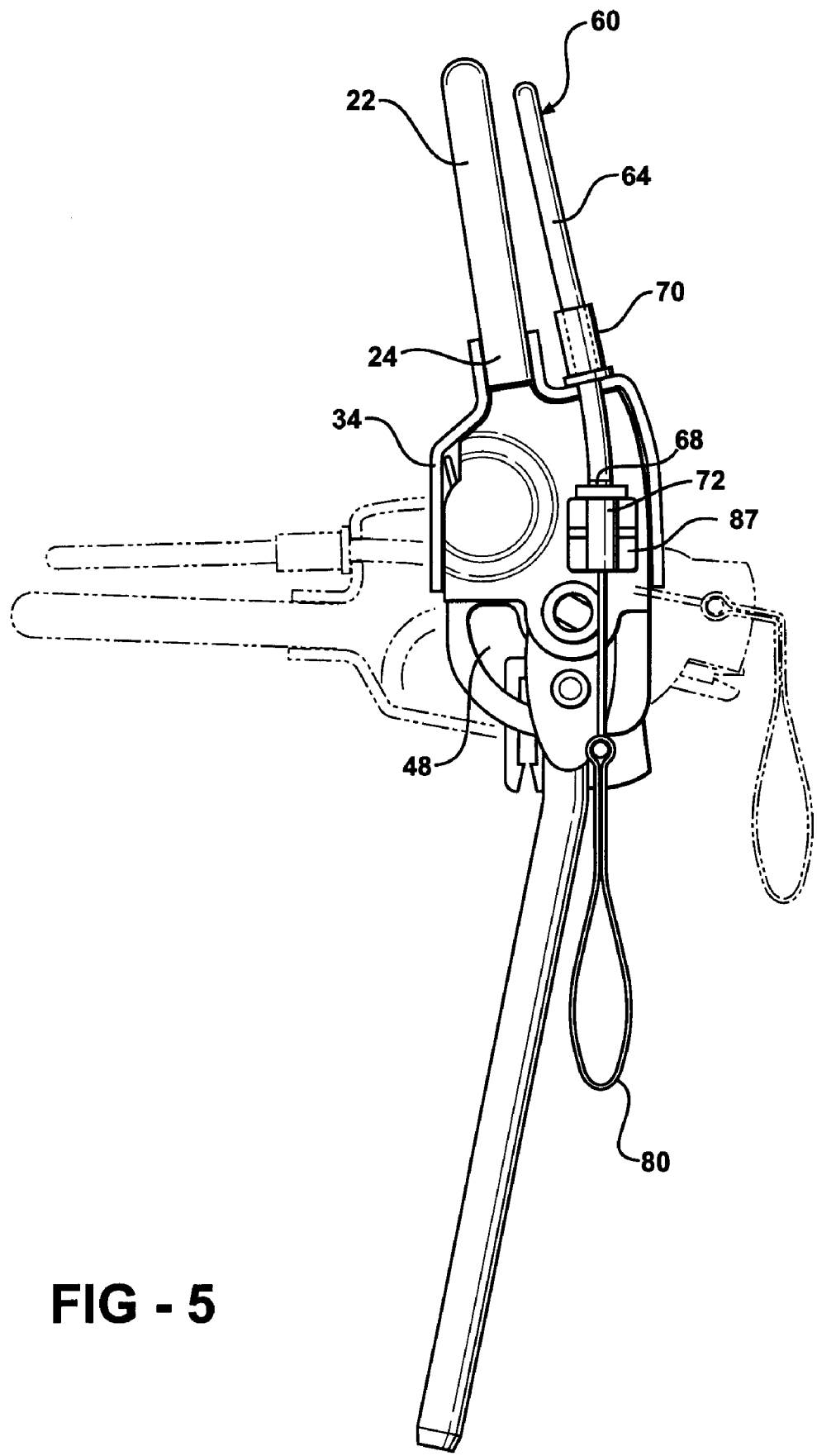
FIG. 5 is a side view of the first embodiment illustrating an upright position in full lines and a forwardly folded position in phantom.
Figure 6:
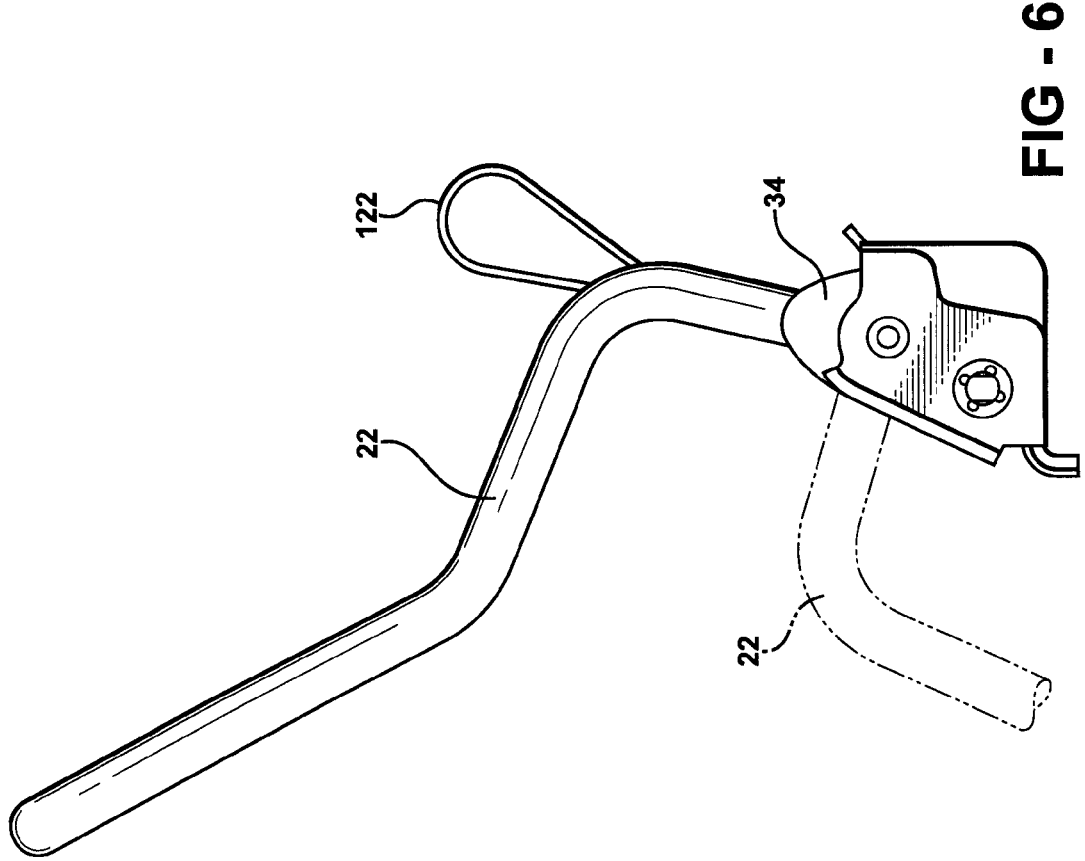
FIG. 6 is a side view of the second embodiment illustrating the upright position in full lines and the forwardly folded position in phantom.

A seat frame 38 presents a first paddle 40 and presents a second paddle 42, the second paddle 42 being spaced from the first paddle 40. The seat frame 38 portion of the headrest can be of many different configurations for presenting the first paddle 40 and the second paddle 42, but as illustrated in FIGS. 1 and 2, the seat frame 38 presents a pair of posts presenting the first and second paddles 40, 42. Alternatively, as shown in FIGS. 3 and 4, the seat frame 38 presents a base and the first and second paddles 40, 42 extend upwards from the base to rotatably support the first and second plates 34, 36. In both embodiments, however, the first and second paddles 40, 42 rotatably support 22, 28 the first and second plates 34, 36 for rotation about an axis (A). The first plate 34 and the second plate 36 rotate in unison about the axis (A) between an upright position and a forwardly folded position, as shown in FIGS. 5 and 6.

Figure 9:
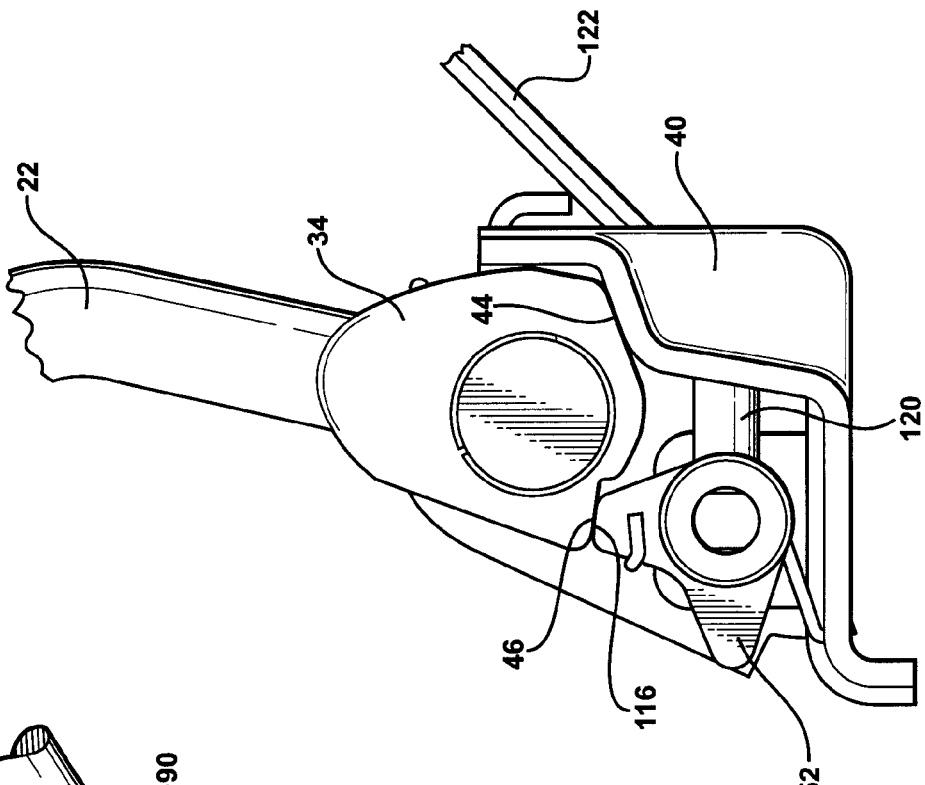
FIG. 9 is a partial cross-sectional view taken along line 9-9 of FIG. 3 of the second embodiment focusing on the latch mechanism.

The rotational movement of the first and second plates 34, 36 about the axis (A) is limited by the location of a first stop 44 and a second stop 46, incorporated on one or both of the plates 34, 36. The first stop 44 engages the associated paddle 40, 42 limiting the rearward rotation of either the first and second plates 34, 36 when the headrest is in the upright position. The first stop 44 limiting the rearward rotation of the first and second plates 34, 36 is imperative for the headrest to support an occupant's head and prevent injury in the event of an accident by preventing the first and second plate 34, 36 from rotating rearward away from the occupant. A second stop 46 incorporated into one or both of the plates 34, 36 limits the forward rotation of the headrest about the axis (A) to define the forwardly folded position. The headrest 20 in the forwardly folded position allows the seat to be compactly folded and/or stored within the vehicle. As shown in FIGS. 2 and 5, the stops 44, 46 in the first embodiment are defined by a guide hole 48 in each of the first plate 34 and second plate 36. The guide hole 48 has an elongate arcuate shape extending a circumferential or arcuate length about the axis (A). The first paddle 40 and second paddle 42 each include a pin 50 extending into the guide hole 48 whereby the pin 50 engages the guide hole 48 to limit the rotation of the first and second plate 34, 36 to that of the ends of the arcuate length (L) of the guide hole 48. Alternatively, in the second embodiment, the stops 44, 46, as shown in FIGS. 4 and 9, are integrally formed into the first plate 34 and second plate 36 as shoulders that limit the rotation by engaging with the associated first paddle 40 or second paddle 42. Additionally, it is to be understood that in either embodiment the stops 44, 46 could be incorporated on one or both of the plates 34, 36, since the first and second plates 34, 36 rotate in unison about the axis (A).

The headrest assembly 20 further includes a latch lever 52 rotatably supported on the first plate 34 for engaging the first paddle 40 opposite the first plate 34 to lock the first plate 34 and the second plate 36 in the upright position. It should be appreciated that the latch lever 52 could be rotatably supported on the first paddle 40 engaging the first plate 34 opposite the first paddle 40 to lock the first plate 34 and the second plate 36 in the upright position. The latch lever 52 is rotatably supported for movement between a latched position and an unlatched position. The latch lever 52 in the latched position secures the first and second plates 34, 36 against the first stop 44 to prevent the first and second plates 34, 36 from rotating about the axis (A). However, when the latch lever 52 is rotated by a manual force into the unlatched position the first and second plates 34, 36 are free to rotate about the axis (A) toward the forwardly folded position.

The latch lever 52 is rotated by a release mechanism 54 between the latched position and the unlatched position. The release mechanism 54 in both the first and second embodiments includes a coil spring 56 that reacts between the latch lever 52 and the first plate 34 or the first paddle 40. The coil spring 56 is configured to bias the latch lever 52 toward the latched position. As shown in FIG. 1, the coil spring 56 in the first embodiment reacts between the first plate 34 and the latch lever 52. In the second embodiment, as shown in FIG. 3, the coil spring 56 reacts between the first paddle 40 and the latch lever 52.

Figure 7:
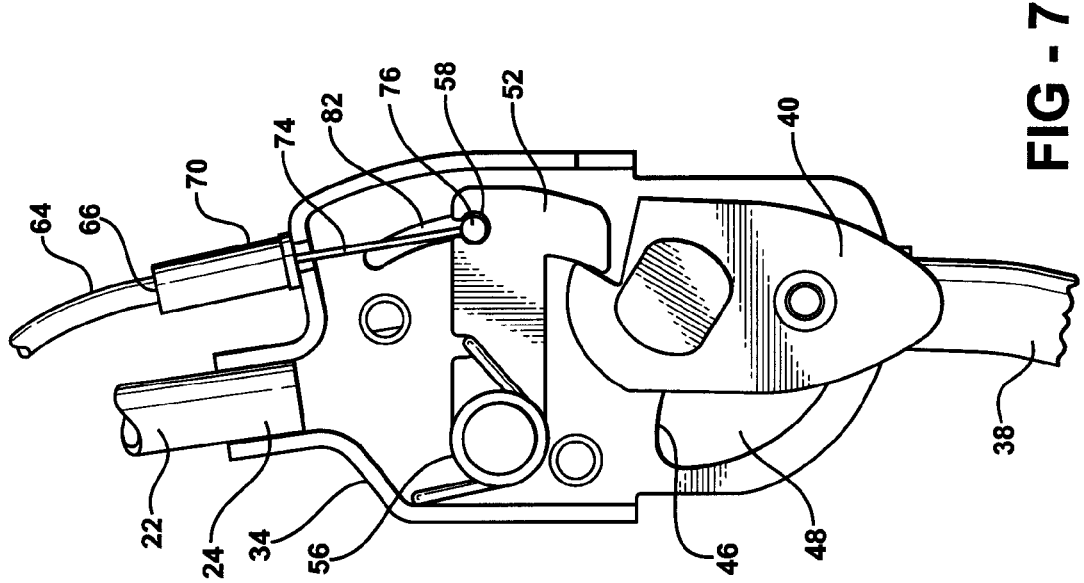
FIG. 7 is a partial side view of the first embodiment with an insert removed focusing on a latch mechanism.

Focusing on FIG. 7, the latch lever 52 in the first embodiment is generally L-shaped and rotatably supported on the first plate 34. The latch lever 52 defines a C-shaped pocket 58 at a distance from the support and rotation point of the latch lever 52. The latch lever 52 engages into a notch 60 on the first paddle 40 in the latched position when the headrest assembly 20 is in the upright position. The latch lever 52 in the unlatched position disengages the notch 60 allowing the first and second plates 34, 36 to rotate about the axis (A) toward the forwardly folded position.

Figure 8:
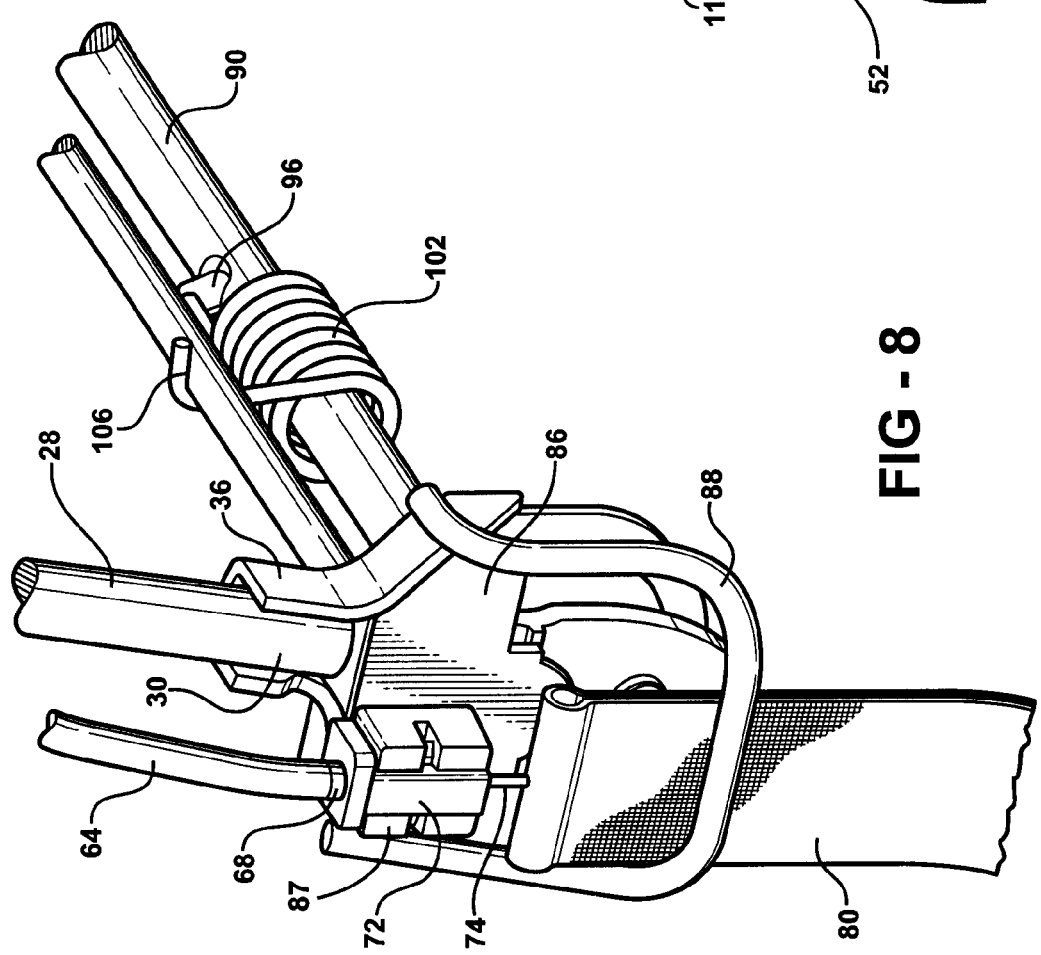
FIG. 8 is a partial side view of the first embodiment focusing on a shield wire.

In the first embodiment as seen in FIGS. 2, 7 and 8, the release mechanism 54 further includes a motion transmitting cable 62 with a sheath 64 having a first end 66 and a second end 68. The first end 66 includes a first fitting 70 and the second end 68 includes a second fitting 72. A core 74 is movably disposed within the sheath 64 for transmitting the manual force that rotates the latch lever 52 out of the latched position and into the unlatched position. As shown in FIGS. 2 and 7, the core 74 includes a first terminal 76 connected to the latch lever 52 and a second terminal 78 connected to a release strap 80 for manually applying the force. The first terminal 76 defines a generally cylindrical end that is received into a C-shaped pocket 58 on the latch lever 52 and extends into an arcuate slot 82 on the first plate 34 for guiding the latch lever 52 as the manual force is applied between the latched and unlatched position. However, one skilled in the art would understand that different configurations would be possible such as incorporating the latch lever 52 and the release mechanism 54 on the first paddle 40.

The release mechanism 54 of the first embodiment allows the headrest assembly 20 to be easily adapted for either the driver side or passenger side of a vehicle, typically for use in the second row of seats in a multi-purpose vehicle. The adaptability of the headrest is accomplished by manipulating the routing of the cable 62 within the assembly 20. Since the release mechanism 54 further includes a first insert 84 supported by the first plate 34 for attaching the first end 66 of the motion transmitting cable 62 and a second insert 86 supported by the second plate 36 for supporting the second end 68 of the motion transmitting cable 62. However, the first insert 84 can support both the first fitting 70 and the second fitting 72 allowing the cable 62 to be manipulated on the same side as the latch lever 52. As shown in FIG. 2, the cable 62 can be manipulated such that either the first or the second insert 84, 86 is supporting the second end 68 of the cable 62 in a connector 87 depending on the desired location of the release strap 80.

Additionally as shown in FIG. 8, the first embodiment includes a shield wire 88 that connects to either the first plate 34 or the second plate 36 depending on the routing of the cable 62 and which insert 84, 86 is supporting the second end 68 of the cable 62. The shield wire 88 provides several benefits one of which is guiding the release strap 80 as the manual force is applied to release the latch lever 52. Therefore, the release strap 80 is routed between the shield wire 88 and either the first or the second paddles 40, 42. In addition, the shield wire 88 provides protection against a force on the release strap 80 in a lateral direction that could cause the second end 68 of the cable 62 to dislodge from engagement with the insert 84, 86. The shield wire 88 further provides additional protection to the release strap 80 from contacting or rubbing additional trim or other components of the seat that may cause the release strap 80 to eventually fray.

The first embodiment of the headrest assembly 20 further includes a shaft 90 extending between and supported by the first and second paddles 40, 42 on the axis (A). The first and second plates 34, 36 include a shaft hole 92 that the shaft 90 passes through for rotatably supporting the first and second plates 34, 36 on the shaft 90. A nyliner bearing 94 is further fitted in the shaft hole 92 of the first and second plates 34, 36 to reduce the frictional resistance of the rotation of the first and second plates 34, 36 on the shaft 90. Furthermore, the nyliner bearing 94 can adapt to some manufacturing variation reducing the chance of binding or undesired looseness between the first and second plates 34, 36 and the shaft 90.

The shaft 90 further includes an ear 96 extending in a transverse direction to the axis (A) and the ear 96 defines a hole 98. Additionally a rod 100 extends between and connects to the first plate 34 and the second plate 36. The rod 100 is spaced at a distance from and parallel to the shaft 90. The configuration and spacing between the rod 100 and the shaft 90 are important since the assembly 20 further includes a spring 102 for biasing the first and second plates 34, 36 toward the forwardly folded position. The spring 102 has a first end 104 that engages through the hole 98 in the ear 96 of the shaft 90 and a second end 106 engages with the rod 100. The spacing of the rod 100 and shaft 90 allows the spring 102 reacting between the rod 100 and shaft 90 to bias the first plate 34 and the second plate 36 toward the forwardly folded position. Therefore, when the headrest is in the upright position the latch lever 52 secures the headrest against the biasing force of the spring 102. The release mechanism 54 rotates the latch lever 52 to the unlatched position and the biasing force of the spring 102 rotates the first and second plates 34, 36 to the forwardly folded position. The headrest assembly 20 is returned to the upright position by manually rotating the headrest against the bias of the spring 102 until the latch lever 52 engages into the notch 60 of the first paddle 40 securing the headrest against the first stop 44.

In addition, the first and second plates 34, 36 of the first embodiment include a tab 108 that extends inward and parallel to the axis (A) from the bottom portion of the first and second plates 34, 36 to supporting a trim piece 110. The trim piece 110 may be used to close off the base of the headrest pad 112, or attach decorative trim to the headrest pad 112. As shown in FIGS. 1 and 2 the trim piece 110 is attached to the tabs 108 by a fastener or other adequate methods known in the art.

Focusing on FIG. 9, the latch lever 52 in the second embodiment presents a face 116 that engages the second stop 46 of the first plate 34 in the latched position when the headrest assembly 20 is in the upright position. The latch lever 52 in the unlatched position disengages the second stop 46 allowing the first and second plates 34, 36 to rotate about the axis (A) toward the forwardly folded position.

The release mechanism 54 of the second embodiment, as shown in FIGS. 3, 4, and 9, is a design typically used in the last row of a multi-purpose vehicle, i.e., the third row of a minivan. The seat frame 38 presents a flange 118 extending upward from the seat frame 38 spaced from and parallel to the first paddle 40. The release mechanism 54 includes a latch handle 120 that extends between and is rotatably supported by the first paddle 40 and the flange 118. The latch handle 120 defines a U-shaped bow and the latch lever 52 is supported on the latch handle 120. A pull strap 122 connects to the latch handle 120 at the U-shaped bow. The manual force on the pull strap 122 rotates the latch handle 120 overcoming the bias force of the coil spring 56 on the latch lever 52 thereby rotating the latch lever 52 to the unlatched position.

Additionally, the second embodiment further includes a pair of rivets 124 that rotatably connect the first and second plates 34, 36 to the associated first and second paddles 40, 42. Either one of the rivets 124 on the first paddle 40 or the second paddle 42 supports a torsional spring 126. The torsional spring 126 reacts between either the first paddle 40 and the first plate 34 or the second paddle 42 and the second plate 36 for biasing the first and second plates 34, 36 toward the forwardly folded position. The latch lever 52 when in the latched position secures the first plate 34 in the upright position opposing the biasing force of the torsional spring 126. The release mechanism 54 rotates the latch lever 52 to the unlatched position and the biasing force of the torsional spring 126 rotates the first and second plates 34, 36 to the forwardly folded position. The headrest assembly 20 is returned to the upright position by manually rotating the headrest against the bias force of the torsional spring 126 until the latch lever 52 engages the second stop 46 securing the first plate 34 against the first stop 44.

Referring to FIGS. 10-16, a third embodiment of the foldable headrest assembly 200 is shown and will now be discussed in further detail below.

Figure 10:
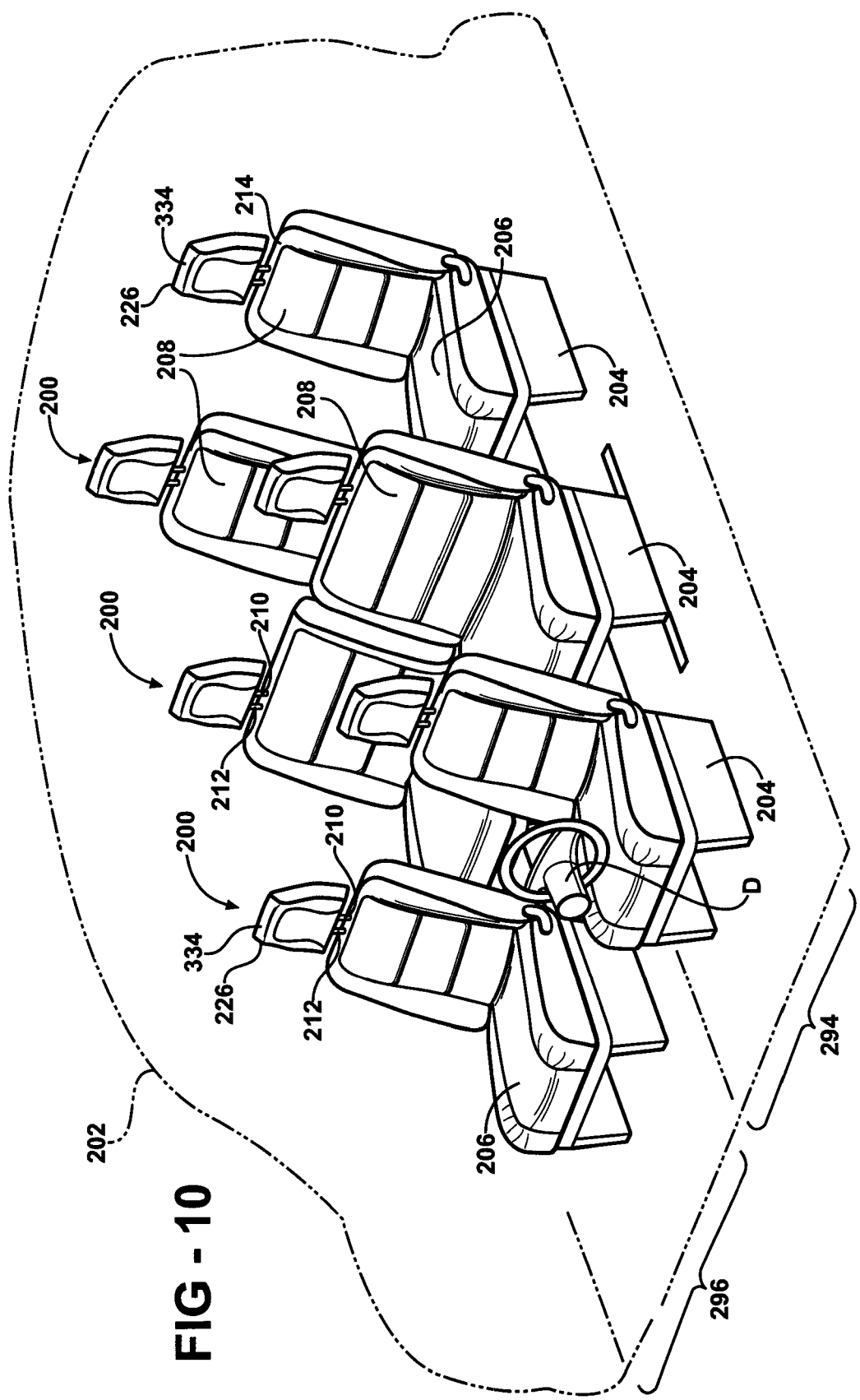
FIG. 10 is a perspective view of a vehicle including a third embodiment in an upright position and including a headrest cover.
Figure 11:
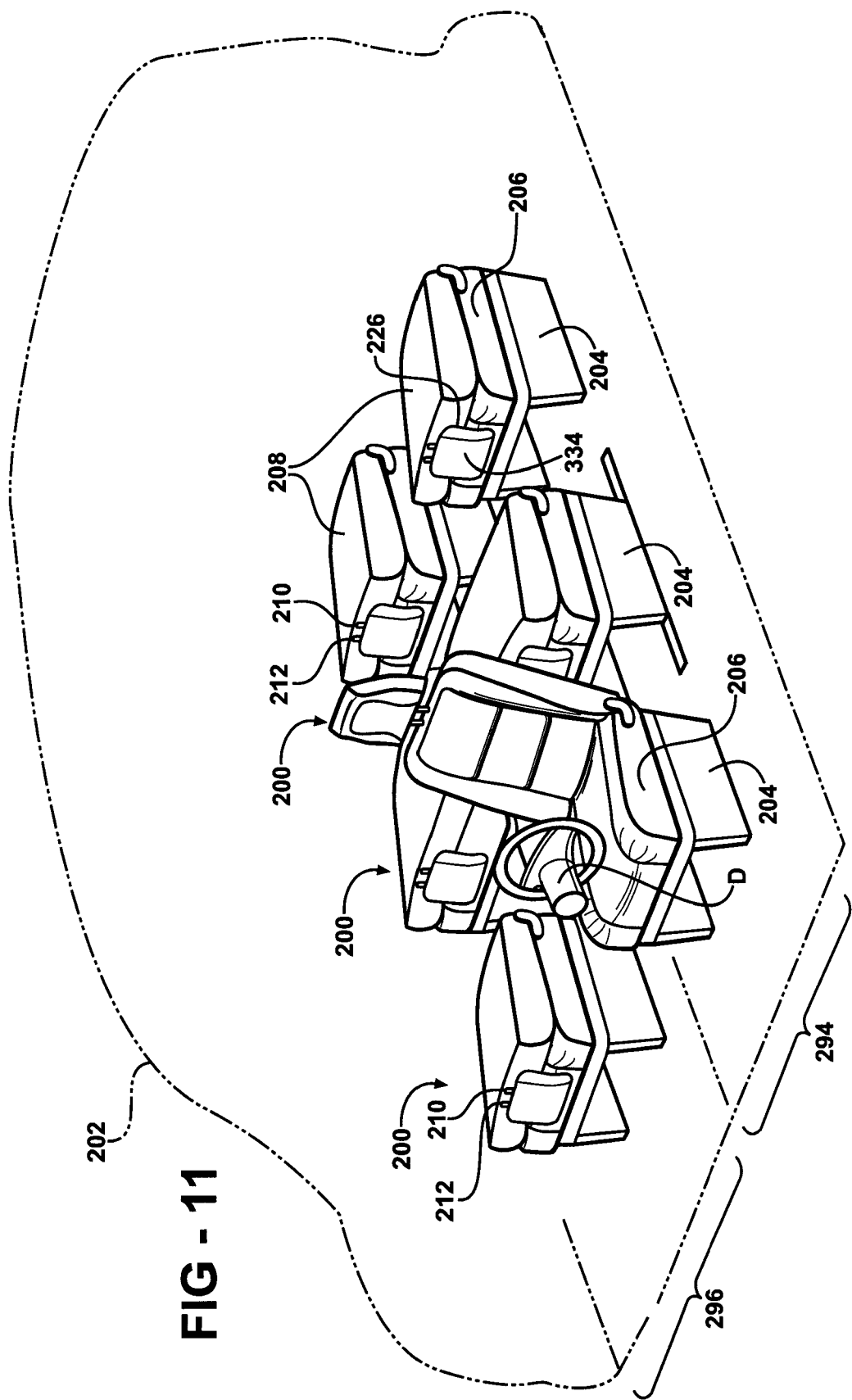
FIG. 11 is a perspective view of the vehicle of FIG. 10 and the third embodiment in a forwardly folded position.

A vehicle including seats 204 is shown generally at 202 (in phantom) FIGS. 10 and 11. The seats 204 include a base 206 and a back 208 extending from the base 206. The foldable headrest assemblies 200 are operatively connected to the seats 204 by a first paddle 210 and a second paddle 212. For example, the paddles 210, 212 of the foldable headrest assemblies 200 are slidably disposed into a top portion 214 of the back 208 of the seats 130. In FIG. 10, the foldable headrest assemblies 200 and the backs 208 of the seats 204 are shown in an upright position. Referring to FIG. 11, the foldable headrest assemblies 200 and the backs 208 of the seats 204 are shown in a forwardly folded position, except at a driver location (D). It is to be appreciated by those of ordinary skill in the art that the present invention is not limited to any particular seat and/or vehicle. It is also to be appreciated that the first and second embodiments of the foldable headrest assembly 20 may also be operatively connected to the seats 204 of the vehicle 202.

Figure 13:
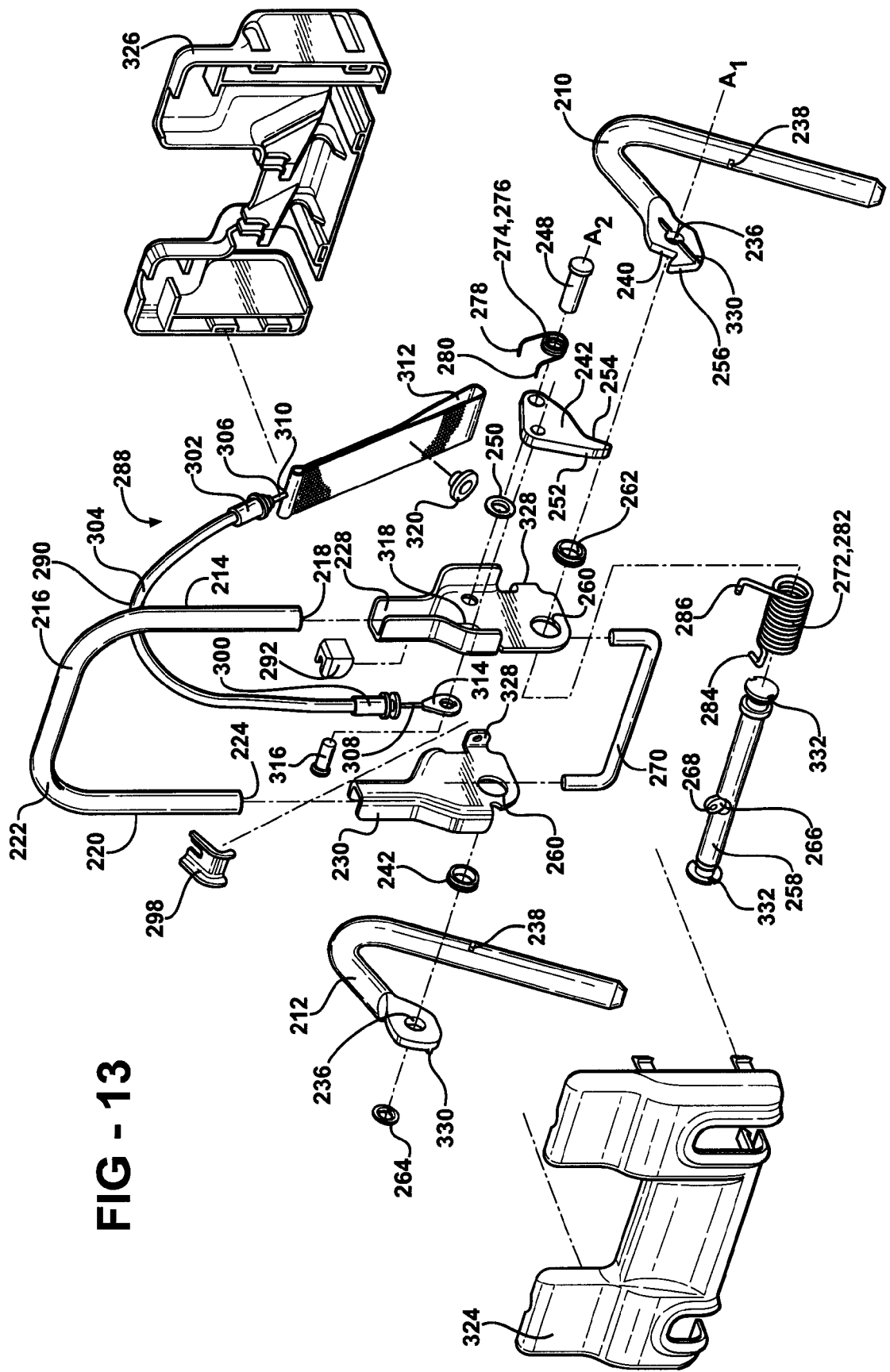
FIG. 13 is an exploded perspective view of the third embodiment of FIG. 12.

As best shown in FIG. 13, a first support 214 extends from a first distal end 216 to a first support end 218. A second support 220 extends from a second distal end 222 to a second support end 224. The second support 220 is spaced from the first support 214. The supports 214, 220 may be formed from a single-piece having a generally C-shape; however, it is to be appreciated that other shapes are also possible. It is also to be appreciated that the supports 214, 220 may be separate and distinct pieces.

Figure 12:
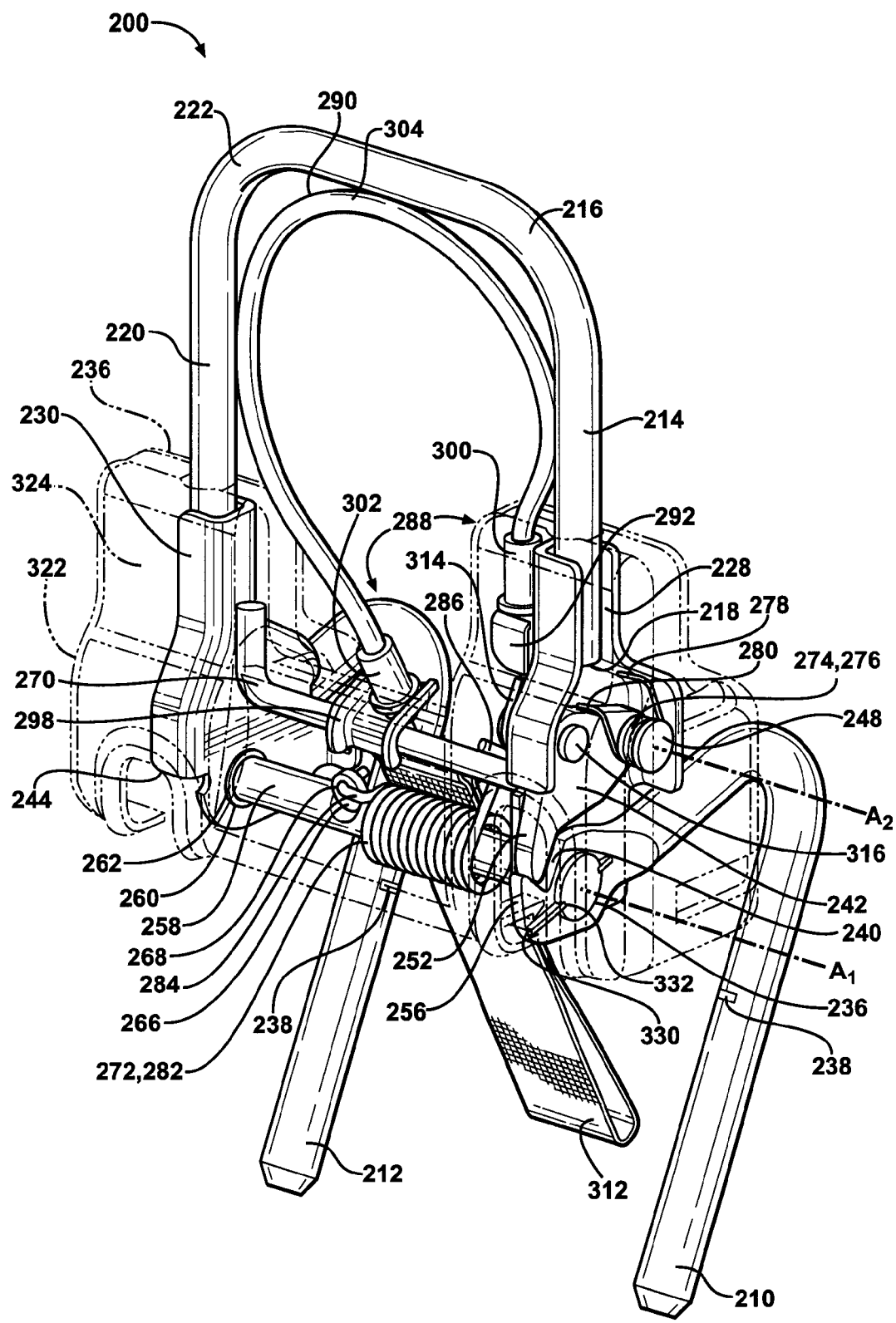
FIG. 12 is a perspective view of the third embodiment without the headrest cover.

As best shown in FIGS. 10, 11, and 14-16, the supports 214, 220 of the foldable headrest assembly 200 support a headrest cover 226. The headrest cover 226 will be further discussed below. Referring to FIG. 12, a first plate 228 extends from the first support end 218 and a second plate 230 extends from the second support end 224. The plates 228, 230 may be distinct pieces attached to the support ends 218, 224 by, for example, welding. It is to be appreciated that the plates 228, 230 may also be integrally formed (not shown) with the support ends 218, 224.

As shown in FIGS. 12 and 13, the first paddle 210 and the second paddle 212 are spaced from each other. The paddles 210, 212 may be configured to have a curvature or may be configured to be straight (not shown). The first paddle 210 and the second paddle 212 each define a paddle hole 236. The first paddle 210 and the second paddle 212 may each further define a locator notch 238. The locator notches 238 are useful for operatively connecting the foldable headrest assembly 200 to the seat 204 at a certain height relative to the top portion 214 of the back 208 of the seat 204. Those of ordinary skill in the art appreciate that the foldable headrest assembly 200 may include a plurality of the locator notches 238. The first paddle 210 defines a lock notch 240. It is to be appreciated that in other embodiments, the second paddle 212 may further include the lock notch 240, in addition to or alternative to, the first paddle 210. Reference to the first plate 228 and to the second plate 230 are interchangeable in the detailed description, likewise, for reference to the first paddle 210 and to the second paddle 212. It is to be appreciated that the first embodiment of the foldable headrest assembly 20 may also include one of more of the locator notches 238.

Figure 14:
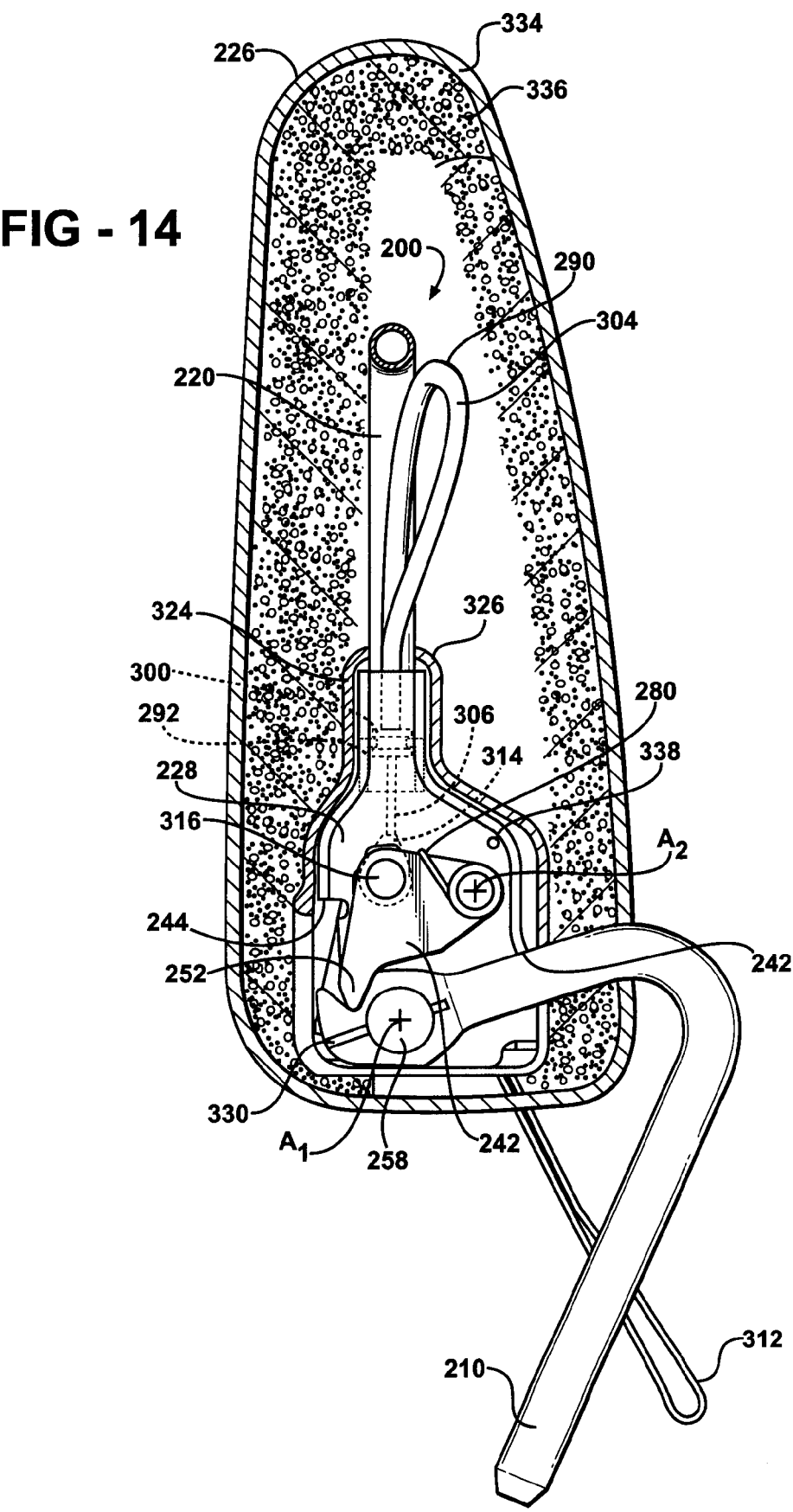
FIG. 14 is a partial cross-sectional view taken along line 14-14 of FIG. 10 focusing on a lock lever of the third embodiment in a locked position.

The first plate 228 is rotatably supported by the first paddle 210 for rotation about a first axis ($A_1$). The second plate 230 is rotatably supported by the second paddle 212 about the first axis ($A_1$). The second plate 230 rotates in unison with the first plate 228 between the upright position as shown in FIGS. 10, 12, and 14, and the forwardly folded position as shown in FIGS. 11 and 16. An intermediary position of the foldable headrest assembly 200 between the upright position and the forwardly folded position is shown in FIG. 15.

At least one of the plates 228, 230 includes a first stop 242 for engaging the associated one of the paddles 210, 212 in the upright position and a second stop 244 for engaging the associated one of the paddles 210, 212 in the forwardly folded position. The rotational movement of the plates 228, 230 about the first axis ($A_1$) is limited by the location of the first stop 242 and the second stop 244 incorporated into the first plate 228 and the second plate 230, respectively. As shown in FIGS. 12 and 14, the first stops 242 engage the paddles 210, 212 while the foldable headrest assembly 200 is in the upright position.

Figure 15:
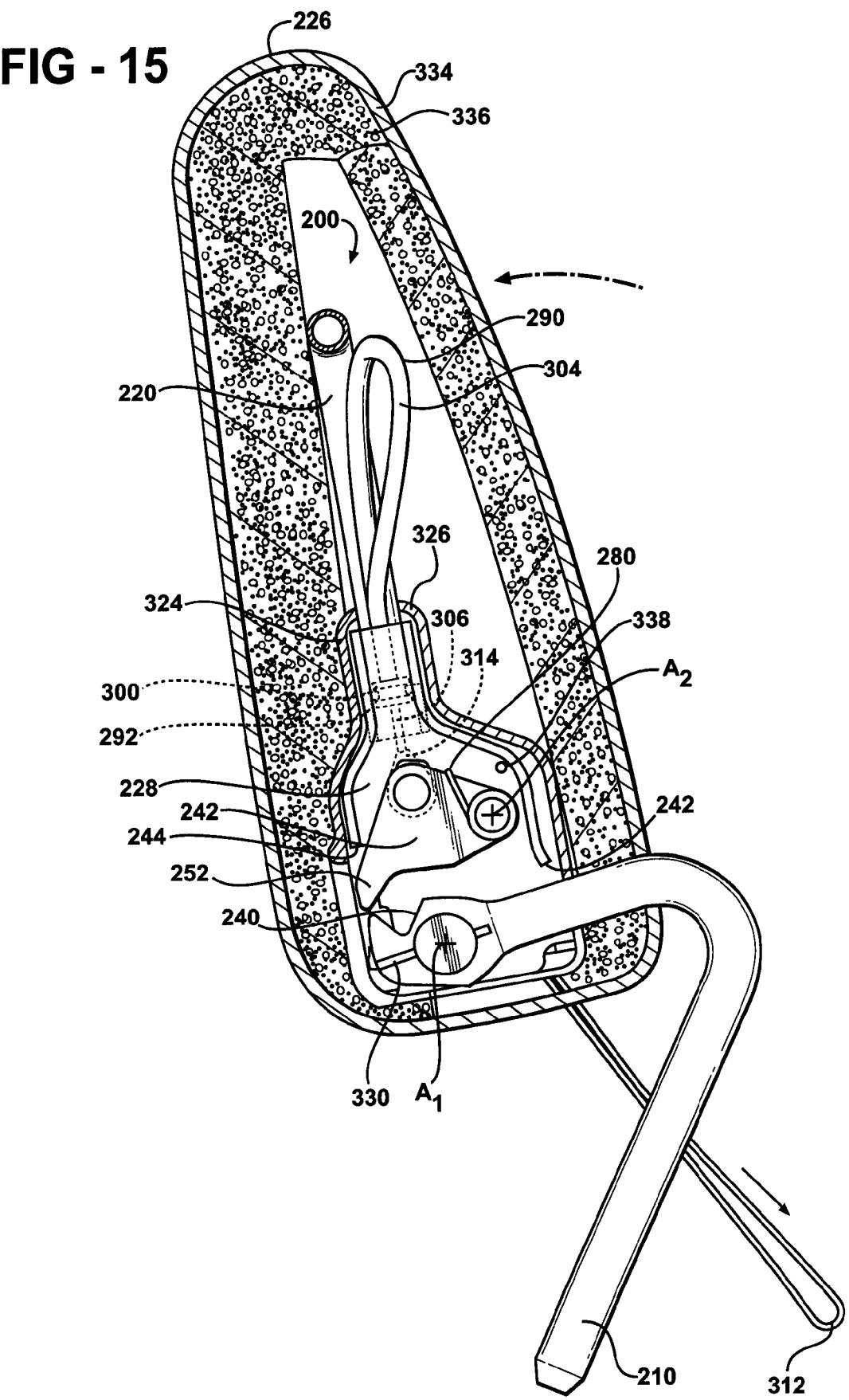
FIG. 15 is a partial cross-sectional view of the third embodiment in an intermediary position while rotating from the upright position to the forwardly folded position.
Figure 16:
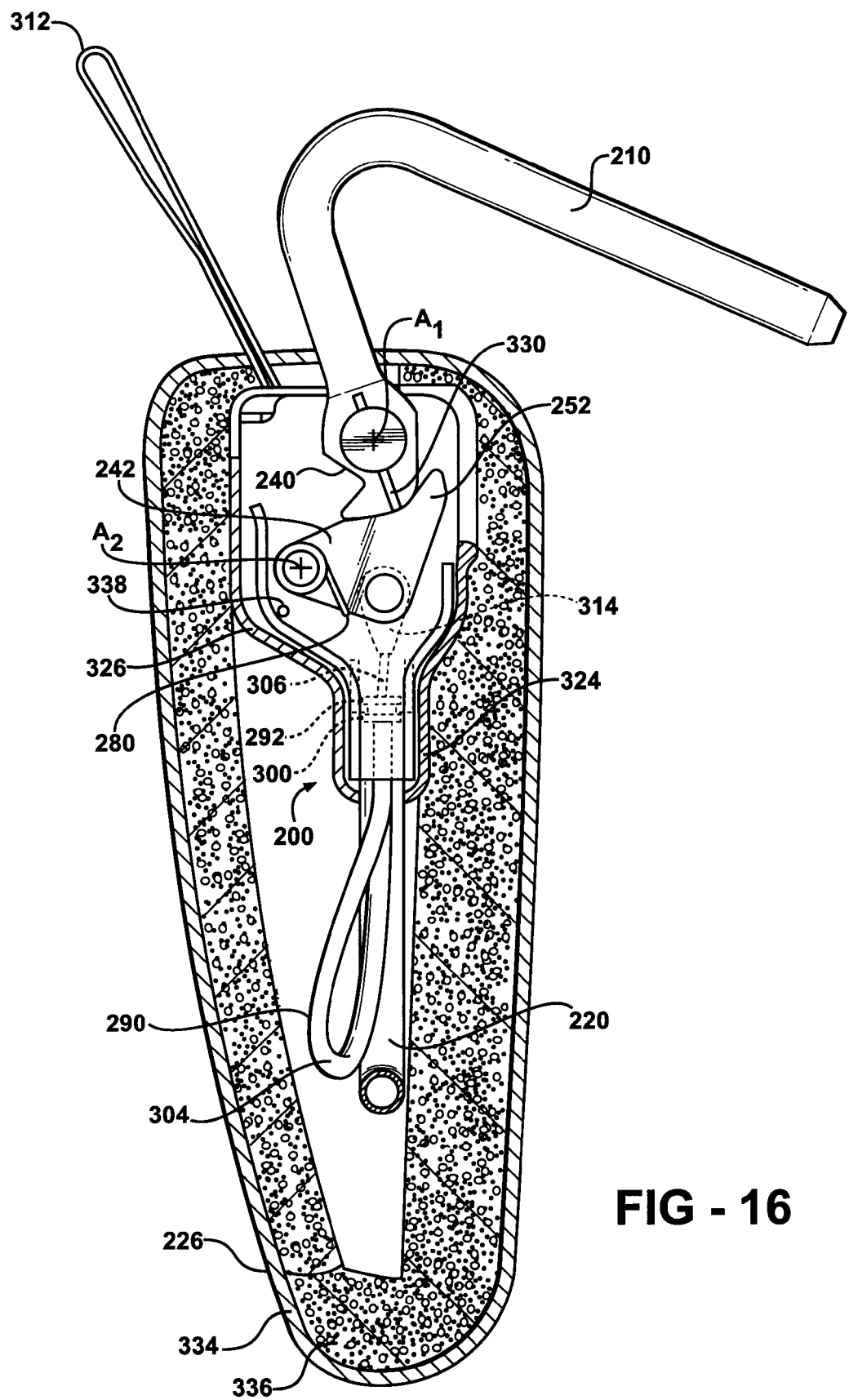
FIG. 16 is a partial cross-sectional view taken along line 16-16 of FIG. 11 focusing on the lock lever of the third embodiment in an unlocked position.

As best shown in FIGS. 12 and 14-16, a lock lever 246 is rotatably supported on the first plate 228. The lock lever 246 rotates about a second axis ($A_2$) between a locked position as shown in FIGS. 12 and 14 and an unlocked position as shown in FIGS. 15 and 16. When in the locked position, the lock lever 246 engages the first paddle 210, i.e., the lock notch 240, for preventing folding movement from the upright position toward the forwardly folded position. When in the unlocked position, the lock lever 246 allows such folding movement toward the forwardly folded position. FIG. 15 illustrates the intermediary position of the foldable headrest assembly 200 moving from the upright position to the forwardly folded position. As previously alluded to, it is to be appreciated that the lock lever 246 may be rotatably supported on the second plate 230. It is also to be appreciated that reference to the lock lever 246 and the latch lever 52 is interchangeable in the description of the present invention. In other words, the latch lever 52 of the first and second embodiments of the foldable headrest assembly 20 may be replaced with the lock lever 246 of the third embodiment of the foldable headrest assembly 200.

As best shown in FIGS. 12 and 14, the lock lever 246 is rotatably supported on a pivot pin 248 on the first plate 228 and the second axis ($A_2$). In FIG. 13, a washer 250 is disposed on the pivot pin 248 between the lock lever 246 and the first plate 228. The washer 250 is an option, which may be useful for reducing friction resistance between the lock lever 246 and the first plate 228. The pivot pin 248 may be secured in place by press-fitting, one of more fasteners, riveting, and other methods known in the art. The lock lever 246 in the locked position secures the lock plates 228, 230 against the first stops 242 to prevent the plates 228, 230 from rotating about the first axis ($A_1$). However, when force is applied to the lock lever 246, the lock lever 246 is rotated into the unlocked position and the plates 228, 230 are free to rotate about the first axis ($A_1$) toward the forwardly folded position.

The lock lever 246 includes a tooth 252. As best shown in FIG. 14, the tooth 252 engages the lock notch 240 in the locked position for preventing folding movement of the foldable headrest assembly 200 from the upright position toward the forwardly folded position. The tooth 252 includes a lock surface 254 and the first paddle 210 includes a return surface 256. As best shown in FIG. 16, the surfaces 254, 256 are complementarily in configuration for guiding the lock lever 246 over the first paddle 210 when moving from the forwardly folded position to the upright position.

Referring to FIG. 12, a shaft 258 extends between and is supported by the paddles 210, 212 on the first axis ($A_1$). As best shown in FIG. 13, each of the plates 228, 230 define a shaft hole 260 that the shaft 258 passes through for rotatably supporting the plates 228, 230 on the shaft 258. The shaft 258 may be secured in place by press-fitting, fastening, riveting, and other methods known in the art. A nyliner bearing 262 may be fitted into each of the shaft holes 260. The nyliner bearings 262 may be useful for reducing frictional resistance of the rotation of the plates 228, 230 on the shaft 258. The nyliner bearings 262 may also adapt to manufacturing variation thereby reducing the chance of binding or undesired looseness between the plates 228, 230 and the shaft 258. Those of ordinary skill in the art appreciate that bearings formed from other materials may also be used for the present invention.

The shaft 258 may further include a pawl nut 264 disposed proximal to the second plate 230. The pawl nut 264 may adapt to some manufacturing variation reducing the chance of binding or undesired looseness between the plates 228, 230 and the shaft 258. As best shown in FIGS. 12 and 13, the shaft includes an ear 266 extending from the shaft 258 transverse to the first axis ($A_1$) and defining a hole 268. A rod 270 extends between and is supported by the plates 228, 230. The rod 270 is also spaced from the shaft 258. The rod 270 may be secured in place by, for example, welding.

As best shown in FIGS. 12 and 13, the paddles 210, 212 each define a key 330 extending outwardly parallel to the first axis ($A_1$). The shaft 258 defines key notches 332 that correspond with the keys 330. The keys 330 and key notches 332 are useful for orienting the ear 266 relative to the rod 270. The shaft 258 may, for example, be orbital riveted to lock the keys 330 and the key notches 332 together. It is to be appreciated that the ear 266 may be oriented relative to the rod 270 by other methods known in the art, i.e., the keys 330 and the key notches 332 are optional for the present invention. It is also to be appreciated that the first and second embodiments of the foldable headrest assembly 20 may also include the keys 330 and the key notches 332.

As best shown in FIG. 12, the foldable headrest assembly 200 further includes a first biasing member 272 disposed between the plates 228, 230 and a second biasing member 274 supported by the first plate 228. The second biasing member 274 engages the lock lever 246. The first biasing member 272 rotatably biases the supports 214, 220 about the first axis ($A_1$) toward the forwardly folded position. The second biasing member 272 rotatably biases the lock lever 246 about the second axis ($A_2$) toward the locked position. The lock lever 246 is biased in a common rotational direction as the rotation of the supports 214, 220 about the first axis ($A_1$). In other words, the biasing members 272, 274 cooperate with each other to bias the lock lever 246 into the lock notch 240. Cooperation of the biasing members 272, 274 also prevents binding of the lock lever 246 in the lock notch 240 when moving from the locked position to the unlocked position. It is to be appreciated that the first embodiment of the foldable headrest assembly 20 may be configured to include the biasing members 272, 274 of the third embodiment.

As best shown in FIG. 12, the second biasing member 274 is a coil spring 276. It is to be appreciated by those of ordinary skill in the art that the second biasing member 274 may be a different biasing member as known in the art. The coil spring 276 is supported by the first plate 228 on the second axis ($A_2$) and reacts between the lock lever 246 and the first plate 228. The coil spring 276 includes a first tip 278 and a second tip 280. As best shown in FIGS. 14-16, the first plate 228 defines a catch hole 338. The first tip 278 (not shown) engages the catch hole 338 and the second tip 278 engages the lock lever 246 to bias the lock lever 246 toward the locked position. It is to be appreciated that the first tip 278 is removed in FIGS. 14-16 to better illustrate the catch hole 338. It is to be appreciated that the catch hole 338 is but one possible option for maintaining a location of the first tip 278 of the coil spring 276.

Referring to FIG. 12, the first biasing member 272 is a spring 282. It is to be appreciated by those of ordinary skill in the art that the first biasing member 272 may be a different biasing member as known in the art. The spring 282 is supported by the shaft 258 on the first axis ($A_1$). The spring 282 includes a first end 284 and a second end 286. The first end 284 engages the hole 268 of the ear 266 and the second end 286 engages the rod 270 to bias the plates 228, 230 toward the forwardly folded position. It is to be appreciated that the first end 284 may also engage just the ear 266 and/or another component of the foldable headrest assembly 200. Spacing of the rod 270 and shaft 258 allows the spring 282 reacting between the rod 270 and shaft 258 to bias the plates 228, 230 toward the forwardly folded position. Therefore, when the foldable headrest assembly 200 is in the upright position, the lock lever 246, while disposed in the lock notch 240, secures the plates 228, 230 against the biasing force of the spring 282.

The lock lever 246 is rotated by a release mechanism 288 between the locked position and the unlocked position. As best shown in FIGS. 12 and 14-16, the release mechanism 288 is operatively connected to the lock lever 246 for rotating the lock lever 246 to the unlocked position. The unlocked position allows the plates 228, 230 to rotate about the first axis ($A_1$) to the forwardly folded position from the upright position. As best shown in FIG. 15, when force is applied to the release mechanism 288, the release mechanism 288 rotates the lock lever 246 out of the locked position into the unlocked position. The biasing force of the spring 282 then rotates the plates 228, 230 toward the forwardly folded position once the lock lever 246 clears the lock notch 240. FIG. 16 depicts the foldable headrest assembly 200 in the forwardly folded position. The foldable headrest assembly 200 is returned to the upright position by, for example, manually rotating the plates 228, 230 against the bias of the spring 282 until the lock lever 246 guides over the first paddle 210 and engages the lock notch 240 securing the plates 228, 230 against the first stop 242. It is to be appreciated that the first embodiment of the foldable headrest assembly 20 may include the release mechanism 288 of the third embodiment. For example, the first embodiment may include the release mechanism 288 of the third embodiment rather than the release mechanism 54 shown in FIG. 1. Conversely, the third embodiment of the foldable headrest assembly 200 may include the release mechanism 54 of the first embodiment rather than the release mechanism 288 shown in FIG. 13.

As best shown in FIGS. 12 and 13, the release mechanism 288 includes a conduit 290 and a cable 306 disposed within the conduit 290. A first end 300 of the conduit 290 is coupled to the lock lever 246. A second end 302 of the conduit 290 is supported between the plates 228, 230 and the supports 214, 220 for rotating the lock lever 246 to the unlocked position, which allows the plates 228, 230 to rotate in unison about the first axis ($A_1$) to the forwardly folded position.

Referring to FIG. 12, a first conduit holder 292 is supported by the first plate 228. A second conduit holder 298 is supported by the rod 270. The second conduit holder 298 is shown about center on the rod 270; however, it is to be appreciated that the second conduit holder 298 may be located anywhere on the rod 270 or may be located anywhere between the plates 228, 230 and the supports 214, 220. A centralized location of the second conduit holder 298 preferably permits the foldable headrest assembly 200 to be easily used in both a driver side 294 and a passenger side 296 of the vehicle 202. The conduit holders 292, 298 may be secured in place by, for example, welding. The release mechanism 288 may further include a release strap 312. It is to be appreciated that the first embodiment of the foldable headrest assembly 20 may include one of or both of the conduit holders 293, 298 of the third embodiment of the foldable headrest assembly 200. For example, the first embodiment may include the second conduit holder 298 supported by the rod 100. It is also to be appreciated that the third embodiment of the foldable headrest assembly 200 may include routing of the conduit 290 like the routing of the motion transmitting cable 62 of the first embodiment. As such, the third embodiment may also include the shield wire 88.

The first end 300 of the conduit 290 is supported by the first conduit holder 292 and the second end 302 of the conduit 290 is supported by the second conduit holder 298. The conduit 290 includes a sheath 304 and the cable 306, which is movably disposed in the sheath 304 for transmitting force to rotate the lock lever 246. The sheath 304 is useful for protecting the cable 306 from, for example, fraying. The cable 306 includes a first terminal end 308 and a second terminal end 310. The first terminal end 308 is coupled to the lock lever 246 and the second terminal end 310 is coupled to the release strap 312 for applying force to the cable 306.

As best shown in FIG. 12, the first terminal end 308 is an eyelet connector 314 operatively connected to the lock lever 246 by a release pin 316. It is to be appreciated that the first terminal end 308 may be other connectors as known in the art. The release pin 316 is slidably disposed in a slot 318 defined by the first plate 228. The release pin 316 may be secured in place and/or connected to the first terminal end 308 by press-fitting, fastening, riveting, and other methods known in the art. As best shown in FIG. 13, the release strap 312 is generally a U-shape; however, other shapes are also possible for the present invention. The release strap 312 may include a button 320, which, for example, may be useful for attaching the release strap 312 to the back 208 of the seat 204.

As best shown in FIGS. 12 (in phantom) and 14-16, the foldable headrest assembly 200 further includes a shell 322; however, it is to be appreciated that in other embodiments, the shell 322 is not included with the foldable headrest assembly 200. Preferably, the shell 322 covers at least one of the lock lever 246 and biasing members 272, 274 for protecting the lock lever 246 and the biasing members 272, 274. As best shown in FIG. 13, the shell 322 comprises a front shell 324 and a rear shell 326 that snap together. It is to be appreciated that the shell 322 may comprise one or more pieces that may be connected by various means and methods known in the art. Protecting the lock lever 246 and the biasing members 272, 274 may be useful for preventing interference with movement of the locking lever 246 and/or the biasing members 272, 274. For example, a portion of the headrest cover 226 may accidentally be pushed into the foldable headrest assembly 200, which may bind the lock lever 246 if not for the shell 322. The shell 322 is typically formed from a plastic material; however, other materials known in the art may also be used. Referring to FIG. 13, a tab 328 extends from each of the plates 228, 230 parallel to the first axis ($A_1$). The tabs 328 may be useful for, but not limited to, securing the shell 322 in place. It is to be appreciated that the first and second embodiments of the foldable headrest assembly 20 may also include the shell 322.

As best shown in FIGS. 14-16, the headrest cover 226 is slidably disposed over the fold headrest assembly 200 such that only the paddles 210, 212 extend out from under the headrest cover 226. The headrest cover 226 may be useful for providing comfort and safety to an occupant (not shown) of the vehicle 202. The headrest cover 226 may further provide a barrier between the occupant and the foldable headrest assembly 200. The headrest cover 226 may comprise a fabric or other material that matches a fabric or other material of the seat 204 and may further comprise interior foam for comfort and safety of the occupant. Those of ordinary skill in the art appreciate that the headrest cover 226 may comprise different materials and may be formed by various methods. For example, and as shown in FIGS. 14-16, the headrest cover 226 may comprise an outer skin 334 formed from an elastomeric material, e.g., a polyurethane elastomer, and a foam-backing layer 336 formed from an injected or molded material, e.g., polyurethane foam. It is to be appreciated that the headrest cover 226 may be formed separate from the foldable headrest assembly 200 or may be formed over the foldable headrest assembly 200. In addition, the headrest cover 226 may be of various sizes and shapes as known to those of ordinary skill in the art. It is to be appreciated that the first and second embodiments of the foldable headrest assembly 20 may include the headrest cover 226 of the third embodiment. For example, the second embodiment may include the headrest cover 226 of the third embodiment rather than the headrest pad 112 shown in FIG. 4.

The foregoing invention has been described in accordance with the relevant legal standards; thus, the description is exemplary rather than limiting in nature. Variations and modifications to the disclosed embodiments may become apparent to those skilled in the art and do come within the cope of the invention. Accordingly, the scope of legal protection afforded this invention can only be determined by studying the following claims. In addition, the reference numerals in the claims are merely for convenience and are not to be read in any way as limiting.

What is claimed is:

1. A foldable headrest assembly for a seat comprising:
   a first support extending from a first distal end to a first support end;
   a second support extending from a second distal end to a second support end and spaced from said first support for supporting a headrest cover;
   a first plate extending from said first support end and a second plate extending from said second support end;
   a first paddle and a second paddle spaced from said first paddle;
   said first plate rotatably supported by said first paddle for rotation about a first axis and said second plate rotatably supported by said second paddle about said first axis for movement of said second plate in unison with said first plate between an upright position and a forwardly folded position;
   a lock lever rotatably supported on said first plate for rotation about a second axis between a locked position engaging said first paddle for preventing folding movement from said upright position toward said forwardly folded position and for movement of said lock lever to an unlocked position allowing such folding movement toward said forwardly folded position; and
   a first biasing member disposed between said plates and a second biasing member supported by said first plate engaging said lock lever with said first biasing member rotatably biasing said supports about said first axis toward said forwardly folded position and said second biasing member rotatably biasing said lock lever about said second axis toward said locked position in a common rotational direction as said rotation of said supports about said first axis.

2. A foldable headrest assembly as set forth in claim 1 wherein said second biasing member is a coil spring reacting between said lock lever and said first plate.

3. A foldable headrest assembly as set forth in claim 2 wherein said first plate defines a catch hole and said coil spring includes a first tip and a second tip with said first tip engaging said catch hole and said second tip engaging said lock lever to bias said lock lever toward said locked position.

4. A foldable headrest assembly as set forth in claim 1 further comprising a shaft extending between and supported by said paddles on said first axis.

5. A foldable headrest assembly as set forth in claim 4 wherein said first biasing member is a spring supported by said shaft on said first axis.

6. A foldable headrest assembly as set forth in claim 5 wherein said shaft includes an ear extending from said shaft transverse to said first axis and defining a hole.

7. A foldable headrest assembly as set forth in claim 6 further comprising a rod extending between and supported by said plates and spaced from said shaft and wherein said spring includes a first end and a second end with said first end engaging said hole of said ear and said second end engaging said rod to bias said plates toward said forwardly folded position.

8. A foldable headrest assembly as set forth in claim 1 wherein said lock lever includes a tooth and said first paddle defines a lock notch and said tooth engages said lock notch in said locked position for preventing folding movement from said upright position toward said forwardly folded position.

9. A foldable headrest assembly as set forth in claim 8 wherein said tooth includes a lock surface and said first paddle includes a return surface with said surfaces being complementarily in configuration for guiding said lock lever over said first paddle when moving from said forwardly folded position to said upright position.

10. A foldable headrest assembly as set forth in claim 1 further comprising a release mechanism operatively connected to said lock lever for rotating said lock lever to said unlocked position allowing said plates to rotate about said first axis to said forwardly folded position from said upright position.

11. A foldable headrest assembly as set forth in claim 1 wherein at least one of said plates includes a first stop for engaging the associated one of said paddles in said upright position and a second stop for engaging the associated one of said paddles in said forwardly folded position.

12. A foldable headrest assembly as set forth in claim 1 further comprising a shell covering at least one of said lock lever and said biasing members for protecting at least one of said lock lever and said biasing members.

13. A foldable headrest assembly for a seat comprising:
   a first support extending from a first distal end to a first support end;
   a second support extending from a second distal end to a second support end and spaced from said first support for supporting a headrest cover;
   a first plate extending from said first support end and a second plate extending from said second support end;
   a first paddle and a second paddle spaced from said first paddle;
   said first plate rotatably supported by said first paddle for rotation about a first axis and said second plate rotatably supported by said second paddle on said first axis for movement of said second plate in unison with said first plate between an upright position and a forwardly folded position;
   a lock lever rotatably supported on said first plate for rotation about a second axis between a locked position engaging said first paddle for preventing folding movement from said upright position toward said forwardly folded position and for movement of said lock lever to an unlocked position allowing such folding movement; and
   a release mechanism having a conduit and a cable disposed within said conduit with a first end of said conduit coupled to said lock lever and a second end of said conduit supported between said plates and said supports for rotating said lock lever to said unlocked position allowing said plates to rotate about said first axis to said forwardly folded position.

14. A foldable headrest assembly as set forth in claim 13 further comprising a rod extending between and connected to said plates and a first conduit holder supported by said first plate and a second conduit holder supported by said rod.

15. A foldable headrest assembly as set forth in claim 14 wherein said first end is supported by said first conduit holder and said second end is supported by said second conduit holder.

16. A foldable headrest assembly as set forth in claim 15 wherein said conduit includes a sheath and said cable includes a first terminal end and a second terminal end, said cable movably disposed in said sheath for transmitting force to rotate said lock lever.

17. A foldable headrest assembly as set forth in claim 16 wherein said release mechanism further comprises a release strap for applying force to said cable and said first terminal end is operatively connected to said lock lever and said second terminal end is operatively connected to said release strap.

18. A foldable headrest assembly as set forth in claim 16 wherein said first terminal end is operatively connected to said lock lever by a release pin slidably disposed in a slot defined by said first plate.

19. A foldable headrest assembly as set forth in claim 13 wherein at least one of said plates includes a first stop for engaging the associated one of said paddles in said upright position and a second stop for engaging the associated one of said paddles in said forwardly folded position.

20. A foldable headrest assembly as set forth in claim 13 further comprising a shell covering at least one of said lock lever and said biasing members for protecting at least one of said lock lever and said biasing members.

* * * * *